United States Patent [19]

Wagner

[11] Patent Number: 4,651,045
[45] Date of Patent: Mar. 17, 1987

[54] ELECTROMAGNETICALLY INTERFERENCE-PROOF FLIGHT CONTROL DEVICE

[75] Inventor: Siegfried Wagner, Ottobrunn, Fed. Rep. of Germany

[73] Assignee: Messerschmitt-Bölkow-Blohm GmbH, Munich, Fed. Rep. of Germany

[21] Appl. No.: 856,681

[22] Filed: Apr. 25, 1986

[30] Foreign Application Priority Data

Apr. 26, 1985 [DE] Fed. Rep. of Germany ....... 3515173

[51] Int. Cl.⁴ .................. H01L 41/08; B64C 13/40
[52] U.S. Cl. .......................... 310/328; 310/339; 310/323; 244/75 R; 244/78; 244/226
[58] Field of Search ............... 310/328, 338, 339, 311, 310/323; 244/75, 78, 226, 227

[56] References Cited

U.S. PATENT DOCUMENTS

| | | | |
|---|---|---|---|
| 3,354,327 | 11/1967 | Benson | 310/339 |
| 3,461,910 | 8/1969 | Selsam et al. | 310/328 X |
| 3,665,226 | 5/1972 | Sinker et al. | 310/339 X |
| 3,865,539 | 2/1975 | Burge, Jr. et al. | 310/339 X |
| 4,553,059 | 11/1985 | Abe et al. | 310/328 |
| 4,567,394 | 1/1986 | Frisch | 310/328 X |

Primary Examiner—Mark O. Budd
Attorney, Agent, or Firm—Kenyon & Kenyon

[57] ABSTRACT

An electromagnetically interference-proof flight control device having an hydraulic positioning drive for a control surface, the position of which is to be influenced. Provided are at least one signal line for feeding in optical control signals, at least one hydraulic pressure line and a return line, an electrohydraulic valve arrangement which precedes the hydraulic positioning drive and is connected to the hydraulic pressure line, an optical-electronic converter which converts the optical control signals into corresponding electronic signals for the electrohydraulic valve arrangement and a hydraulic-electric energy converter. The hydraulic-electric energy converter serves as an electric energy source for the opto-electronic converter and for addressing the electrohydraulic valve arrangement. To accomplish the hydraulic-electric energy conversion for the internal power supply in a manner as interference-free and wear-free as possible, the hydraulic-electric energy converter comprises a fluidic oscillator and one or more piezoelectric elements acted upon by the former with periodically variable pressure.

5 Claims, 3 Drawing Figures

4,651,045

ELECTROMAGNETICALLY INTERFERENCE-PROOF FLIGHT CONTROL DEVICE

BACKGROUND OF THE INVENTION

The present invention relates to an electromagnetically interference-proof flight control device having a hydraulic positioning drive also called hydraulic actuator for a control surface, the position of which can be adjusted.

Such a device is known from the company brochure of the firm Bertea Corp., Irvine, Calif., with the title "Hydra-Optic Servo Control Demonstrator". There, a control device for aircraft is presented which is completely shielded from external electromagnetic interference. The control signals are fed in optically, and more specifically via light guides. The power for actuating the positioning drive for the control surface to be adjusted is supplied via a hydraulic pressure line with which a hydraulic return line is associated. This flight control device is characterized by the feature that there are no electric leads of any kind which could be subjected to electromagnetic interference. The device is connected to the outside world only via light guides as well as hydraulic lines. In the interior of the device, the optical control signals are converted in an opto-electronic converter into corresponding drive signals for an electrohydraulic valve arrangement which precedes the positioning drive and serves to supply the latter with hydraulic energy in the manner determined by the control signals, to thereby bring about the desired setting of the control surface. The power required for the opto-electronic signal conversion as well as for driving the electrohydraulic valve arrangement is made available by a hydraulic motor which is fed from the hydraulic pressure line in parallel with the mentioned valve arrangement.

It must be viewed as a disadvantage of the known flight control device that a hydraulic motor is used for the internal power supply. While it is avoided thereby that electric energy must be fed in from the outside as is known, for instance, from EP-A1 0 046 875 (see FIG. 7), whereby electromagnetic interference can penetrate, such a hydraulic motor has moving parts and is therefore interference-prone as well as wear-prone and consequently requires a certain amount of maintenance.

SUMMARY OF THE INVENTION

It is, therefore, an object of the present invention to provide a flight control device of the type mentioned above, in which the hydraulic-electric energy conversion for the internal power supply is assured reliably such that it is as interference-free and wear-free as possible, and such that the use of mechanically moving parts is avoided.

According to the present invention, the above and other objects are achieved by the provision that the hydraulic-electric energy converter comprises a fluidic oscillator and one or more piezoelectric elements acted upon by the former with periodically variable pressure. In particular, piezoceramic elements may be used. Use is made of the piezoelectric effect, according to which certain crystals, as soon as they are put under pressure in a preferred direction, generate a potential difference depending on the magnitude of this pressure. In addition, a fluidic oscillator known per se is employed, into which a pressurized fluid flows on the input side and which is internally designed so that this fluid stream is directed alternatingly into two different output channels, utilizing the Coanda effect. In the hydraulic-electric converter to be used according to the invention, preferably a piezoelectric or piezoceramic element is placed at the output channels of the fluidic oscillator, so that these elements are alternatingly subjected to fluidic pressure. On the output side, an electric a-c voltage can then be supplied from these elements which in practice can assume orders of some 100 volts at several 1000 Hz. The hydraulic-electric converter designed in this manner has no mechanically moving parts and is thereby not trouble-prone and is subjected to extremely little wear. Connected therewith is high operating reliability as well as a long service life. In addition, such an energy converter can be produced cost-effectively and is characterized by less space and weight required as compared with an hydraulic motor.

A special feature is further that only relatively small currents can be supplied from the output of the hydraulic-electric energy converter and therefore only relatively small amounts of power. However, relatively high voltages are available. The invention is therefore applicable especially if in the electrohydraulic valve arrangement which precedes the positioning drive, valves are used which can be driven by means of piezoelectric and in particular, piezoceramic elements. While such valves are known per se (see, for instance, Ninth European Rotorcraft Forum "Servoactuator Using Digital Input Signals" by G. Diessel, Sept. 13 to 15, 1983, Stresa, Italy, Paper No. 36), their application in combination with the hydraulic-electric energy converters proposed by the invention has not yet been proposed anywhere. Such valves, the valve stroke of which is generated by means of piezoelectric or piezoceramic elements, usually switch back and forth in pulse operation between an open and a closed position in accordance with the arriving electrical drive signals. However, no large currents are needed for this purpose, as is the case, for instance, with magnetic valves. Rather, constant voltages are sufficient, on the magnitude of which the valve stroke depends, and therefore only extremely small amounts of power. Exactly these conditions prevail, however, in the application of the hydraulic-electric energy converters consisting of the fluidic oscillator as well as piezoceramic or piezoelectric elements at their output. The a-c voltages available only need to be converted into corresponding d-c voltages for driving the mentioned valves.

BRIEF DESCRIPTION OF THE DRAWINGS

The invention will be explained in greater detail in the following description with reference to the drawings, in which.

DETAILED DESCRIPTION

Figure 1:
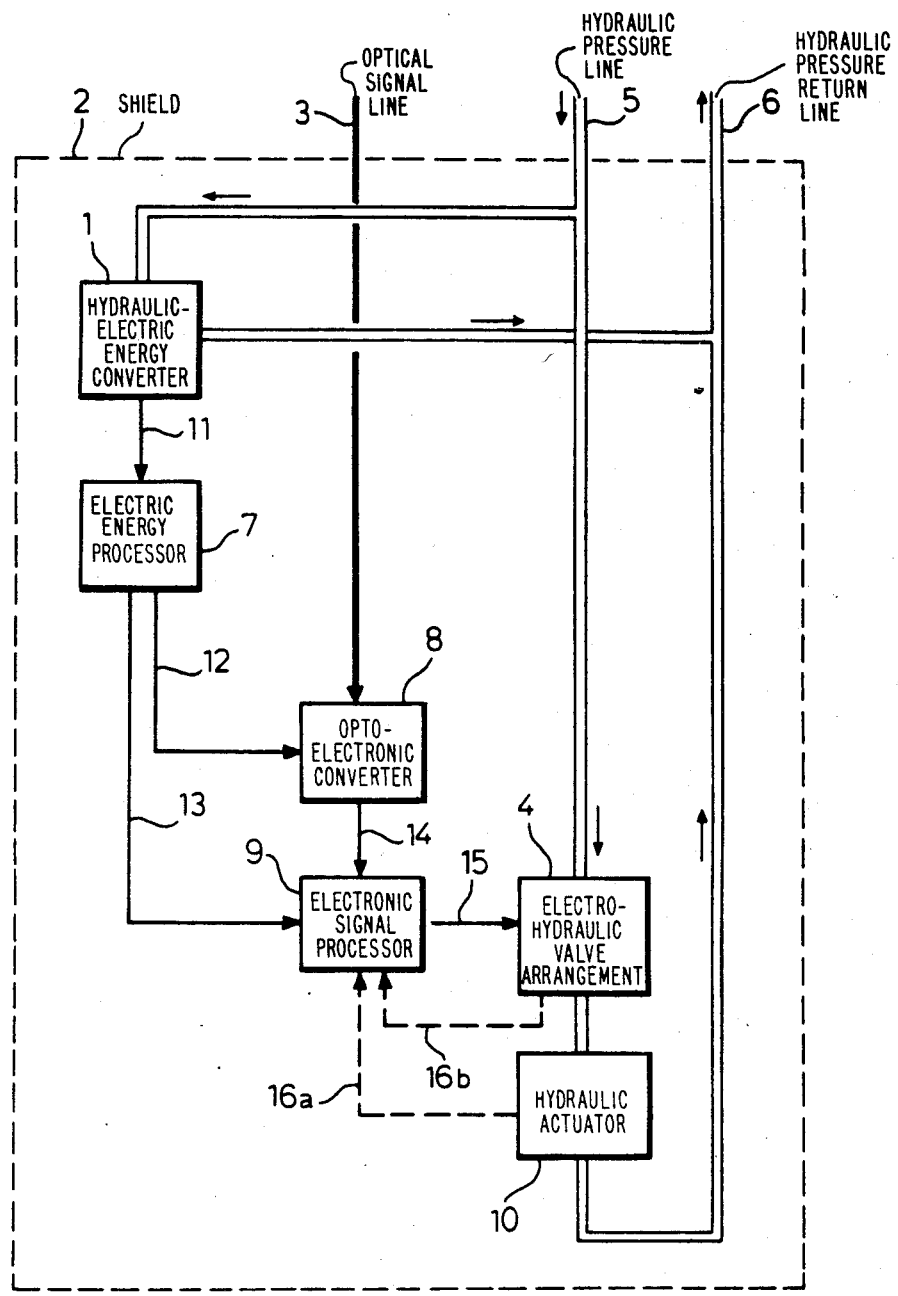
FIG. 1 shows a block diagram of a flight control device according to the invention.

With reference now to the drawings, FIG. 1 schematically shows the flight control device of the present invention enclosed by an electromagnetic shield 2. Its interior is connected to the outside world by an optical signal line 3, a hydraulic pressure line 5 as well as a hydraulic return line 6. In addition, a hydraulic positioning drive 10 located in the interior of the shield 2 has a functional connection, not shown, to the control surface, not shown, which is likewise located in the outside space. The hydraulic pressure line 5 is connected to an electrohydraulic valve arrangement 4 as well as to a hydraulic-electric energy converter 1. Via a signal line 15, control signals are fed to the electrohydraulic valve arrangement 4, by which their state is influenced in such a way that the positioning member of the hydraulic positioning drive 10 connected thereto is brought into the desired position.

Via the optical signal line 3, for instance, on the initiative of the pilot, optical control signals are supplied which are insensitive to electromagnetic interference that might occur, like the hydraulic lines. The optical signal guide 3 will generally be a light guide. The optical signals arrive at an opto-electronic converter 8, which may, for instance, be a photodiode.

At the output of the opto-electronic converter 8 are present electronic signals which correspond to the optical control signals and which are fed to an electronic signal processing unit 9 via a signal line 14. This signal processor furnishes driving signals for the electrohydraulic valve arrangement 4, where reset signals coming via a signal line 16a from the hydraulic positioning drive 10 as well as via a signal line 16b from the electrohydraulic valve arrangement 4 are taken into consideration, which indicate the actual position of the positioning member or the valve slide. The electric energy for the driving signal which can be fed to the electrohydraulic valve arrangement 4 comes from an electric energy processor 7 which is in communication via an electric line 13 with the electronic signal processor as well as, via an electric line 12, with the opto-electronic converter 8. The electric energy processor 7 follows the hydraulic-electric energy converter 1 via an electric connecting line 11.

Figure 2A:
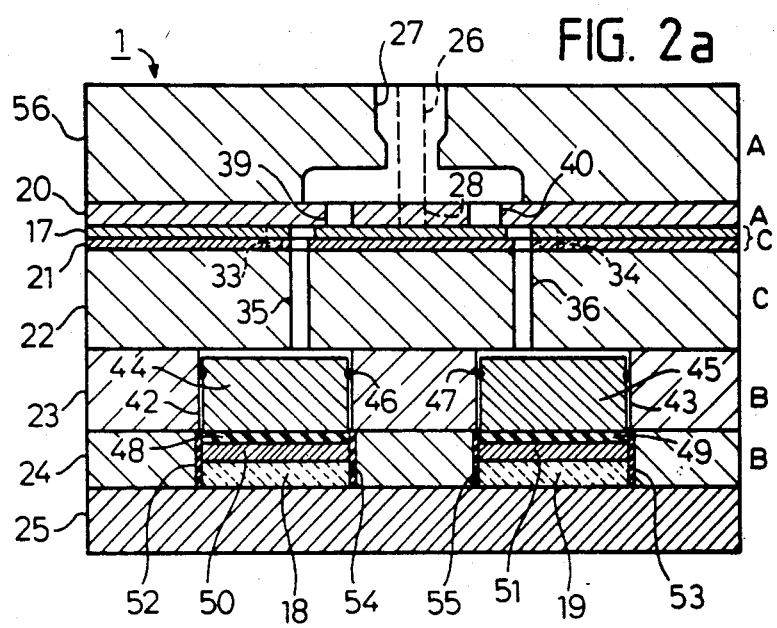
FIG. 2a shows a cross section through a hydraulic-electric energy converter according to the invention.
Figure 2B:
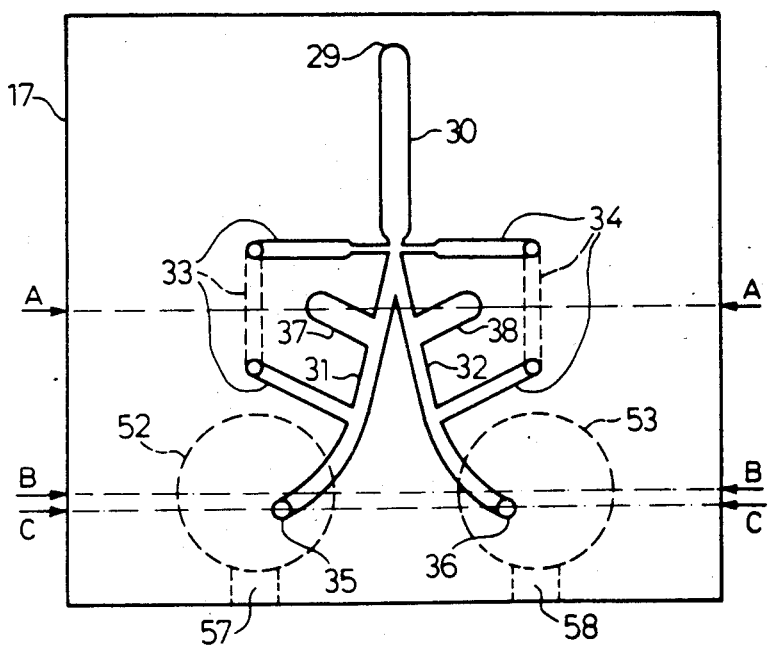
FIG. 2b shows a fluidic oscillator which forms part of the hydraulic-electric energy converter according to FIG. 2a in a top view.

According to the invention, the hydraulic-electric energy converter 1 comprises a fluidic oscillator 17 and one or more piezoelectric elements 18 which are acted upon by the oscillator 17 with periodically variable pressure (see FIGS. 2a and 2b). This hydraulic-electric energy converter 1 is capable of delivering at its output an electric a-c voltage of several 100 V, using the hydraulic energy available at its input (hydraulic pressure line 5); frequencies in the kHz range are achieved. These values depend on the available hydraulic pressure as well as the dimensions of the fluidic oscillator and the dimensions as well as the type of piezoelectric elements used. Using a hydraulic-electric energy converter of this type in an electromagnetically interference-proof flight control device thus has the advantage that no leads are necessary for the electric power supply and that furthermore, because there are no moving parts, an extremely long life is possible because of the small amount of wear. The hydraulic-electric energy converter 1 is further characterized by high operating reliability and an extremely small amount of required maintenance.

The low power a-c voltage (order of magnitude about 50 watts) available on the output side at the hydraulic-electric energy converter 1 is fed via the electric connecting line 11 to the electric energy processor 7, where the a-c voltage is transformed as required in such a manner as is demanded by the connected consumers, namely, optionally the opto-electronic converter 8 as well as the electronic signal processor 9 which again serves for controlling the electrohydraulic valve arrangement 4. Advantageously, valves which can be addressed by means of piezoelectric and, in particular, piezoceramic elements can be used in this electrohydraulic valve arrangement 4. For actuating such valves or elements, d-c voltage pulses of longer or shorter duration are again required as already mentioned above, and it is advantageous for this purpose that the electric energy processor 7 generates a d-c voltage from the a-c voltage present at the input and supplies the latter via the electric line 13 to the electronic signal processor 9 which again delivers d-c voltage pulses corresponding to control and feedback signals arriving via the signal line 14 as well as lines 16a and b, to the piezoelectric elements of the electrohydraulic valve arrangement 4. The valves which can be driven piezoelectrically and are generally operated in the two states "on/off" have, besides the advantage of small power consumption, the further advantages of digital addressibility as well as of very short switching times. In principle, however, it is also possible to use classical servo valves such as magnetic valves.

FIGS. 2a, b, show how a hydraulic-electric energy converter 1 according to the invention can be designed. An essential component is a fluidic oscillator 17 which is shown in a top view in FIG. 2b. The embodiment shown comprises a rectangular metal plate, into which the flow canals shown in FIG. 2b by solid lines are milled. The fluidic oscillator 17 realized as a plate is part of an overall arrangement which comprises several stacked up and, for instance, bolted together plates to which respectively different functions are assigned as is shown in a cross section in FIG. 2a. The cross sections are taken in the different plates in different sectional planes, the position of which is again given in FIG. 2b by arrows as well as by dashed-dotted lines. In an upper plate, a distributor block 56, and a fluid inlet 26 as well as a fluid outlet 27 are provided. A fluid inlet 26 is in communication, via a corresponding connecting opening 28 in an intermediate plate 20 arranged below the distributor block 56 with the outer end 29 of the inlet canal 30 of the fluidic oscillator 17. Via this inlet canal 30, the in-flowing pressurized fluid is supplied to one of the two outlet canals 31 and 32. Return canals 33 and 34 serve, in a manner known per se, to let the fluid flow oscillate between the output canals 31 and 32. These return canals 33, 34 are arranged, in their sections (dashed in FIG. 2b) parallel to the inlet canal 30 in the return plate 21 arranged under the plate forming the fluidic oscillator 17 as is indicated there (FIG. 2a) by dashed lines. The ends of the output canals 31, 32 are in communication with holes 35, 36 which are brought through the return plate 21 as well as through the connecting plate 22 located underneath. The output canals 31, 32 are further provided with laterally opening outlet canals 37, 38 which are connected via holes 39, 40 in the intermediate plate 20 to the fluid outlet 27 in the distributor block 56. The flowing fluid leaves the hydraulic-electric converter 1 via this path and then gets into the return line 6 via a hydraulic branch line 41 (see FIG. 1).

Below the connecting plate 22 is arranged a cylinder plate 23 which is provided with two cylindrical recesses 42, 43. In these recesses, two pistons 44, 45 are arranged which rest against the walls of the recesses 42, 43 by means of ring seals 46, 47. The pistons 44, 45 are acted upon via the holes 35, 36 which are in communication with the ends of the output canals 31, 32 of the fluidic oscillator 17 with the fluid pressure which has an oscillating waveshape. Below the cylinder plate 23 is arranged a support plate 24 for the piezoelectric or piezoceramic elements 18, 19. In the embodiment shown, these elements have approximately the shape of tablets and are acted upon by the oscillating pressure via insulating platelets 48, 49 as well as contact platelets 50, 51 from the side of the pistons 44, 45. On their other sides, the piezoelectric or piezoceramic elements 18, 19 rest on a metallic base plate 25, the contact platelets 50, 51, on the one hand, and the base plate 25 on the other hand, serve as electrodes, at which the piezoelectrically generated a-c voltages can be taken off. The insulating platelets 48, 49, the contact platelets 50, 51, as well as the piezoelectric or piezoceramic elements 18, 19 are inserted into cylindrical recesses 52, 53 in the support plate 24 where a short circuit between the contact platelets of the base plate is prevented by ring-shaped insulators 54, 55 at the walls of these recesses. Through lateral holes 57, 58 (see FIG. 2*b*), which connect the interior of the recesses 52, 53 in the support plate 24 to the outside space, insulated electrode leads can be brought to the contact platelets 50, 51. In the connecting plate 22 venting canals (not shown) which are brought in laterally and can be closed off by sealed screws may further be provided.

Hydraulic oil is advantageously used as the fluid. The supply pressure can be chosen up to about 20 MPa (200 bar). With customary piezoceramic elements, the dimensions of which can be chosen, for instance, with a thickness of 2 mm and a diameter of 26 mm, peak voltages of about 600 V with a frequency of about 4000 Hz and an electric power of about 3.5 W can be obtained. The pressure recovery is about 60 to 70%. It should be noted that the presentations of FIGS. 2*a* and 2*b* are not to scale but are rather schematic.

The hydraulic-electric energy converter which, according to the invention, can be used in flight control devices of the type described, consisting of a fluidic oscillator as well as piezoelectric or piezoceramic elements, is usable not only for the application described but in all cases where a hydraulic-electric energy conversion is required and similar requirements as to the electric output quantities (relatively high voltage, relatively small currents as well as relatively small amounts of electric power that can be taken off) must be met.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly to be regarded in an illustrative rather than a restrictive sense.

What is claimed is:

1. A flight control device substantially free from electromagnetic interference having a hydraulic actuator means for controlling the position of a control surface, at least one signal line for supplying optical control signals to the control device, at least one hydraulic pressure and return line coupled to the control device, electric-hydraulic valve means coupled to and for controlling the hydraulic actuator means and being connected to the hydraulic pressure line, an opto-electronic converter means which converts the optical control signals into corresponding electronic signals for the valve means and a hydraulic-electric energy converter means which provides electric power for the opto-electronic converter means and for the valve means, the hydraulic-electric energy converter means comprising fluidic oscillator means coupled to the hydraulic pressure and return line for providing a periodically variable pressure and at least one piezoelectric means coupled to the fluidic oscillator means and responsive to the periodically variable pressure.

2. The flight control device recited in claim 1, wherein the piezoelectric means comprise piezoceramic means.

3. The flight control device recited in claim 1, wherein said valve means comprise means responsive to further piezoelectric means for operating said valve means.

4. A hydraulic-electric energy converter comprising fluidic oscillator means and piezoelectric means, said piezoelectric means being supplied with periodically variable pressure from said fluidic oscillator means.

5. The hydraulic-electric energy converter recited in claim 4 wherein the piezoelectric means comprises piezoceramic means.

* * * * *